United States Patent [19]

Clements et al.

[11] 4,153,671
[45] May 8, 1979

[54] CATALYTIC GAS PURIFICATION PROCESS

[75] Inventors: Porter Clements, Whiting; Michael R. Basila, Munster, both of Ind.; James J. Barry, La Grange, Ill.

[73] Assignee: Nalco Chemical Company, Oak Brook, Ill.

[21] Appl. No.: 758,966

[22] Filed: Jan. 13, 1977

[51] Int. Cl.$^2$ ............................................. B01D 53/34
[52] U.S. Cl. ..................................... 423/244; 423/245; 423/247; 423/437; 423/564; 423/648 R; 423/656; 585/258; 585/275
[58] Field of Search ............... 423/230, 244, 570, 648, 423/245, 247, 248, 564, 563; 252/435, 437; 260/683.9

[56] References Cited
U.S. PATENT DOCUMENTS

| | | | |
|---|---|---|---|
| 3,232,887 | 1/1966 | Pessimisis | 252/437 X |
| 3,752,877 | 8/1973 | Beavon | 423/244 |
| 4,041,130 | 8/1977 | Mackles | 423/244 |

OTHER PUBLICATIONS

"Fuel Flue Gases", American Gas Association, New York, N. Y., 1940, p. 26.

*Primary Examiner*—Earl C. Thomas
*Attorney, Agent, or Firm*—Richard L. Johnston

[57] ABSTRACT

Hydrogen-containing gas mixtures including saturated and unsaturated hydrocarbon gases, carbon monoxide and organic sulfur contaminants are purified by passing them over a hydrogenation catalyst containing phosphorus with the addition of predetermined limited amounts of water. The process makes it possible to produce hydrogen-containing gases which can be used for hydrogenation processes with the elimination or reduction of carbon monoxide, olefins and organic sulfur, all brought about simultaneously by passing the gas mixture over the same catalyst and in the same reactor.

4 Claims, No Drawings

CATALYTIC GAS PURIFICATION PROCESS

BACKGROUND

One of the problems involved in purifying gas mixtures such as gas mixtures containing hydrogen, saturated and unsaturated hydrocarbons, carbon monoxide and organic sulfides, e.g., mercaptans such a methyl and ethyl mercaptan, carbonyl sulfide (COS) and carbon disulfide ($CS_2$) resides in the fact that there are a number of competing chemical reactions which can occur and which are not compatible with one another. Thus, carbon monoxide can be removed by reaction with water to form hydrogen and carbon dioxide in what is called the water-gas shift reaction. Olefins such as ethylene can be eliminated by saturation with hydrogen. Organic sulfur contaminants such as carbonyl sulfide (COS), methyl and ethyl mercaptan and carbon disulfide are rather difficult to remove from such gas mixtures. Another reaction which occurs in the methanation reaction wherein one mole of carbon monoxide reacts with three moles of hydrogen to produce one mole of methane and one mole of water. This reaction occurs with subtantial increases in temperature so that it is difficult to control, especially if it occurs simultaneously with other reactions.

A well known carbon monoxide shift catalyst is an iron oxide-chromium oxide catalyst. Metallic iron is undesirable in this catalyst because it catalyzes the methanation reaction and also a reaction whereby two molecules of carbon monoxide break down to form one molecule of carbon dioxide and one molecule of carbon. Some catalysts such as $Fe_2O_3$ promoted with $Cr_2O_3$ are sulfur resistant. Other catalysts such as copper deposited on zinc oxide which can be used in the carbon monoxide shift reaction will not tolerate even traces of sulfur.

U.S. Pat. No. 3,850,840 discloses a process for preparing hydrogen and carbon dioxide by contacting carbon monoxide and steam with a chromium oxide promoting ferric oxide catalyst comprising an alkali metal compound and a hydrogenation-dehydrogenation component comprising vanadium, molybdenum, tungsten, cobalt, tantalum, or niobium materials or mixtures thereof, or mixtures of materials comprising a vanadium, molybdenum, tungsten, cobalt, tantalum or niobium material or mixtures thereof with a nickel, iron or chromium material or mixtures thereof.

Another patent disclosing a process for preparing hydrogen and carbon dioxide with similar type catalysts is U.S. Pat. No. 3,850,841.

These patents for the most part are concerned with relatively simple gas mixtures in which the major components are hydrogen and carbon monoxide and minor components are carbon dioxide, nitrogen, methane and hydrogen sulfide. The principal reaction involved is the conversion of carbon monoxide to hydrogen and carbon dioxide so that there is no substantial problem with regard to competing reactions where organic sulfur contaminants are present or where unsaturated hydrocarbons such as olefins are present.

The problem of preparing hydrogen suitable for use in hydrotreating petroleum hydrocarbons or for the manufacture of ammonia, or for other purposes where hydrogen of high purity is desired, becomes more complicated when the original source of the hydrogen is one which also produces olefins such as ethylene and organic sulfur compounds of the type previously mentioned as well as carbon monoxide, all of which have to be removed before the hydrogen is suitable for the aforesaid intended purposes. As an example, gas mixtures of this type are produced by heating shale under anaerobic conditions. It is theoretically possible to remove the unwanted impurities by a series of steps in which each of them is removed in a separate step but it would be highly desirable, if possible, to remove or reduce the unwanted impurities such as carbon monoxide, olefins and organic sulfur compounds in a single step while at the same time controlling the reactions involved so as to avoid uncontrollable temperature conditions.

OBJECTS

One of the objects of the present invention is to provide a new and improved process for purifying hydrogen-containing gas mixtures of the type previously described by a single stage process wherein impurities such as carbon monoxide, olefins and organic sulfur compounds are removed or greatly reduced in a single purification step.

Another object of the invention is to provide a new and improved process for removing carbon monoxide from hydrogen-containing gas mixtures.

A further object of the invention is to provide a new and improved process for removing olefins such as ethylene or propylene from hydrogen-containing gas mixtures by converting such olefins to saturated hydrocarbons.

An additional object of the invention is to provide a new and improved process for removing or reducing organic sulfur compounds such as methyl and ethyl mercaptans, carbonyl sulfide and carbon disulfide from hydrogen-containing gas mixtures. Other objects will appear hereinafter.

BRIEF SUMMARY OF THE INVENTION

In accordance with the invention, hydrogen-containing gas mixtures including saturated and unsaturated hydrocarbon gases, carbon monoxide and organic sulfur contaminants are purified by passing them over a hydrogenation catalyst containing phosphorus with the addition of predetermined limited amounts of water. The process makes it possible to produce hydrogen-containing gases which can be used for hydrogenation processes with the elimination or reduction of carbon monoxide, olefins and organic sulfur, all brought about simultaneously by passing the gas mixture over the same catalyst and in the same reactor.

DETAILED DESCRIPTION OF THE INVENTION

In the practice of the invention especially good results have been obtained by passing hydrogen-containing gas mixtures including carbon monoxide, ethylene or other unsaturated hydrocarbons as well as saturated hydrocarbons and organic sulfur compounds such as methyl and ethyl mercaptans, carbonyl sulfide and carbon disulfide in contact with a phosphorus-containing hydrogenation catalyst under controlled temperature conditions within the range of 500° F. to 750° F. with the addition of limited quantities of water usually within the range of 1% to 10% by volume of the total gas mixture at super-atmospheric pressures, usually within the range of 100 to 400 pounds per square in gauge (psig).

The gas space velocity (GHVS), i.e., cubic feet of gas per hour per cubic foot of catalyst including the added water, is subject to wide variation but is usually within the range of 2200 to 12,000 including total fresh feed and recycled gases.

Recycling of the gases is a preferred procedure because the end products obtained after passage over the catalyst contain saturated hydrocarbons which do not take part in the purification reactions and therefore serve as inert diluents that assist in controlling the temperature during the purification step. The amount of recycled gas which is mixed with the fresh feed is subject to variation depending upon the particular components of the gas mixture and the quantities thereof. Satisfactory results have been obtained by using a volume ratio of recycled gas to fresh feed gas mixture of 3:1. However, in some instances, recycling may not be necessary and in other cases a volume ratio within the range of 1:1 to 5:1 may be used.

Phosphorus-containing hydrogenation catalysts of the type employed in the practice of the invention are disclosed in U.S. Pat. No. 3,232,887. These catalysts are preferably cobalt, molybdenum, phosphorus catalysts or cobalt, nickel, molybdenum, phosphorus catalysts and they are preferably supported on alumina. The quantity of phosphorus in the catalyst is subject to variation but is preferably within the range of 1% to 15% by weight, calculated as $P_2O_5$. Preferred catalysts contain from 3.0-7.0% by weight of a mixture of nickel oxide and cobalt oxide, calculated as NiO and CoO; 12.0-20.0% by weight of molybdenum, calculated as $MoO_3$, and 2.5-7.0% by weight phosphorus, calculated as $P_2O_5$.

The invention will be further illustrated but is not limited by the following examples in which the quantities are by volume unless otherwise indicated.

In order to evaluate the invention, metered blends of gases were passed downflow through a 1" I.D. (inner diameter) heated Inconel reactor approximately 50" long with the catalyst bed constituting a 15" length in the intermediate portion of the reaction 21' and 36" from the bottom of the reactor. The reactor was surrounded by an electrically heated furnace. A one-to-one volume mixture of catalyst and inert (tab) alumina was placed in the 15" lengthwise space in the intermediate portion of the reactor, the volume being approximately 200 cc (i.e., 100 cc of catalyst and 100 cc of tab alumina). Means were provided for measuring temperature at the top of the catalyst, the central part of the catalyst and the bottom of the catalyst. Effluent flowed through a cooling coil to a separator vessel and thence to a vent. Olefins in the metered blends of gases were represented by ethylene, saturated hydrocarbons by methane and/or ethane, and organic sulfur compounds by carbonyl sulfide. In addition, the feed mixtures contained carbon monoxide, hydrogen, hydrogen sulfide, and in some runs methyl and/or ethyl mercaptans. Water addition was accomplished by running a portion of the feed gas through a saturator held at the appropriate temperature to produce a desired partial water pressure in the system. Methane was added to the mixture to simulate recycle conditions in order to control the temperature, the simulated conditions being those of a 3:1 volume ratio of recycled gases to feed mixture.

Feed and product samples were analyzed for non-sulfur compounds by gas chromatography and/or mass spectrometry and for sulfur compounds in a gas chromatograph equipped with a flame photometric detector.

The pressure was fixed at 365 psig, the gas space velocity was varied within the range of 2260 to 11,300 GHSV (total fresh feed plus recycled). The COS concentration (carbonyl sulfide) was varied within the range of 170 to 400 ppm by volume in a single stage and 10-14 ppm by volume in a simulated second stage. The temperature was varied within the range of 500°-740'° F. The second stage referred to above as a clean-up processing stage.

The catalyst used was a 1/16" extrudate with an incipient wetness per volume of 0.85 ml/gm containing 12.3% $MoO_3$, 2.9% CoO and 2-5% $P_2O_5$ impregnated onto alumina. The surface area of the catalyst was 240 $m^2$/gm and the pore volume 0.55 $cm^3$/gm.

EXAMPLE I

Using a reaction temperature of 575°-704° F. with an average temperature of 631° F. and a space velocity of 4520 GHSV a metered blend of gases was passed through the catalyst, said blend of gases having the following composition:
  1.3% CO
  6.4% $H_2$
  88.7% Methane
  3.5% Ethylene
  0.1% Ethane
  370 ppm $H_2S$, and
  400 ppm COS (carbonyl sulfide)

Without the addition of water, the effluent contained,
  0.1% CO
  2.8% $H_2$
  91.9% $CH_4$
  no $C_2H_4$
  340 ppm $H_2S$ and
  20 ppm COS With the addition of 2.5% water based on the total gas stream, the gas analysis of the effluent gases showed:
  1.0% $CO_2$
  0.4% CO
  3.8% $H_2$
  91.1% $CH_4$
  no $C_2H_4$
  3.6% $C_2H_6$
  220 ppm $H_2S$ and
  6 ppm COS Thus, the conversion of CO without the water was 7.7% and with the water 71%. The conversion of $C_2H_4$ to ethane was 100% with and without the water. The conversion of the COS was 95.2% without the water and 98.5% with the water.

EXAMPLE II

The procedure was the same as in Example I except that the temperature varied from a minimum of 520° to 705° F. The space velocity was 2260 GHSV and 5% water was added rather than 2.5%. The effluent gases contained:
  1.42% $CO_2$
  0.25% CO
  5.67% $H_2$
  89.07% $CH_4$
  no $C_2H_4$
  3.60% Ethane
  89 ppm $H_2S$
  5.9 ppm COS

EXAMPLE III

In this run the amount of hydrogen was increased and the feed gases contained:
  1.30% CO
  22.74% $H_2$
  67.63% $CH_4$
  3.10% $C_2H_4$
  5.23% $C_2H_6$
  170 ppm $H_2S$
  270 ppm COS
  12 ppm $CH_3SH$ and
  2.1 ppm $C_2H_5SH$ The temperature varied within a range of 540°–704° F. with an average temperature of 673° F. The space velocity was 2260 GHSV and the amount of water added was 5% based on the total feed. The effluent gases contained.
  1.02% $CO_2$
  0.23% CO
  20.09% $H_2$
  70.12% $CH_4$
  no $C_2H_4$
  8.54% $C_2H_6$
  840 ppm $H_2S$
  8.4 ppm COS
  no $CH_3SH$ and
  no $C_2H_5SH$ The percent conversion of CO was 84%, of $C_2H_4$ 100%, and of COS 97%.

EXAMPLE IV

The procedure was the same as in Example III except that the temperature range was 575°–667° F. and the gas feed mixture contained:
  1.26% CO
  30.03% $H_2$
  61.10% $CH_4$
  3.03% $C_2H_4$
  4.59% $C_2H_6$
  2.8 ppm $H_2S$
  200 ppm COS and
  5.3 ppm $CH_3SH$ The effluent contained:
  0.96% $CO_2$
  0.31% CO
  29.48% $H_2$
  61.23% $CH_4$
  no $C_2H_4$
  8.02% $C_2H_6$
  430 ppm $H_2S$
  3.40% COS and
  no $CH_3SH$ The conversion of CO was 75.4%, the conversion of $C_2H_4$ was 100% and the conversion of COS was 98.3%.

EXAMPLE V

The procedure was the same as in Example I except that 50 cc of catalyst was used instead of 100 cc, the temperature varied from a minimum of 513°–675° F., the space velocity was 11,300 GHSV, the amount of water added was 2.5% of the total feed. The gas feed contained:
  1.3% CO
  8.9% $H_2$
  85.9% $CH_4$
  0.1% $C_2H_6$
  3.7% $C_2H_4$
  260 ppm $H_2S$, and
  400 ppm COS The effluent gases contained:
  0.9% $CO_2$
  0.6% CO
  6.0% $H_2$
  88.1% $CH_4$
  0.4% $C_2H_4$
  3.8% $C_2H_6$
  410 ppm $H_2S$
  40 ppm COS The conversion of CO was 60.0%, the conversion of $C_2H_4$ was 89.5% and the conversion of COS was 91.5%.

EXAMPLE VI

The procedure was the same as in Example I except that the temperature range was 583°–598° F. and the gas blend was chosen to illustrate a second stage clean-up, i.e., simulating a first stage effluent. In this case the feed contained:
  14.91% $H_2$
  79.69% $CH_4$
  0.6% $C_2H_4$
  5.34% $C_2H_6$
  480 ppm $H_2S$
  14 ppm COS and
  15 ppm $CH_3SH$ The effluent from the simulated second stage contained:
  14.35% $H_2$
  80.67% $CH_4$
  no $C_2H_4$
  4.98% $C_2H_6$
  550 ppm $H_2S$
  no COS and
  no $CH_3SH$ When a comparable second stage simulated run was made using alumina alone as the catalyst ($Al_2O_3$), the clean-up of COS was also complete but the effluent gases contained 6.1 ppm $CH_3SH$ and 24 ppm $C_2H_5SH$, thereby illustrating that in the presence of alumina alone mercaptan formation can occur, presumably because of the absence of the hydrogenation function of the phosphorus-containing catalyst and the presence of an equilibrium shift.

Example I illustrates that the addition of water reduces the quantity of COS as compared with the same procedure carried out with the phosphorus-containing catalyst without water.

The examples also illustrate that the depression of ethylene hydrogenation rate in the presence of water at space velocities required for high COS conversion does not reduce saturation significantly.

It also appears from the examples that most of the CO is converted to hydrogen and there is no significant methanation.

High catalyst bed outlet temperature (740° F.) seems to improve COS conversion by results in mercaptan formation, probably from $H_2S$ and ethylene present.

The effluent gases can be further processed according to methods well known in the art in order to remove contaminants such as hydrogen sulfide. The organic contaminants such as carbonyl sulfide and carbon disulfide are rather difficult to remove but hydrogen sulfide can be removed by scrubbing with alkaline aqueous solutions.

Although a catalyst of the type illustrated in the examples is preferred, the invention is not limited to any particular phosphorus containing catalyst. As illustrations of other specific catalysts there may be mentioned a cobalt-molybdenum-phosphorus catalyst supported on boehmitic alumina gel, the resulting catalyst containing the equivalent of 14.6% $MoO_3$, 3.7% CoO and 3.1% $P_2O_5$, the surface area being 362 $m^2$/gm, the pore volume as determined by nitrogen 0.70 $cm^3$/gm and the apparent bulk density being 0.58 gm/ml.

Another example of a suitable catalyst is one containing 14.9% $MoO_3$, 2.97% NiO and 2.8% $P_2O_5$ supported on gamma alumina and having a surface area of 255 $m^2$/gm and a pore volume of 0.54 $cm^3$/gm. Other phosphorus-containing hydrogenation catalysts with larger amounts of phosphorus and especially those containing catalytically active elements from Group VIII of the Periodic Table such as cobalt and nickel, and catalytically active elements from Group VI of the Periodic Table such as molybdenum and tungsten can be used.

The invention makes it possible to purify hydrogen-containing gas mixtures of the type previously described by a single stage process wherein impurities such as carbon monoxide, olefins and organic sulfur compounds are removed or greatly reduced and converted to other compounds which can be readily removed by procedures well known to those skilled in the art.

It is believed that the results obtained are due to the fact that the amount of water added is sufficient to hydrolyze carbon disulfide and carbonyl sulfide under the conditions used and to some extent causes conversion of the carbon monoxide in the gases to form hydrogen and carbon dioxide. The hydrogen in the gases under the conditions used reacts with olefins such as ethylene to convert them by saturation to saturated hydrocarbon such as ethane.

It is also contemplated that the catalytic gas purification process herein described will be especially useful in purifying gases produced by heating shale under anaerobic conditions.

The invention is hereby claimed as follows:

1. A process for purifying hydrogen-containing gases which contain carbon monoxide, olefins, hydrogen sulfide, and organic sulfur compounds which comprises adding a predetermined limited amount of water to such gases and passing the resultant gases into contact with a hydrogenation catalyst containing phosphorus under controlled temperature conditions within the range of 500°–750° F. and under superatmospheric pressures, the amount of water added being within the range of 1% to 10% by volume of the total gas mixture, and said hydrogenation catalyst containing one or more of the elements cobalt, nickel and molybdenum and 1% to 15% by weight phosphorus, calculated as $P_2O_5$, the conditions being such as to reduce the amount of organic sulfur compounds in said gas mixture and convert olefins to saturated hydrocarbons.

2. A process as claimed in claim 1 in which said hydrogenation catalyst consists essentially of 3.0% to 7.0% by weight of a mixture of nickel oxide and cobalt oxide, calculated as NiO and CoO, 12.0% to 20.0% by weight molybdenum, calculated as $MoO_3$, and 2.5% to 7.0% by weight phosphorus, calculated as $P_2O_5$, supported on alumina.

3. A process as claimed in claim 1 in which the gas space velocity in within the range of 2200 to 12,000 GHSV.

4. A process as claimed in claim 1 in which the phosphorus containing catalyst consists essentially of approximately 12.3% $MoO_3$, 2.9% CoO, and 2.5% $P_2O_5$, impregnated on gamma alumina and having a surface area of approximately 240 $m^2$/gm and a pore volume of approximately 0.55 $cm^3$/gm.

* * * * *

UNITED STATES PATENT AND TRADEMARK OFFICE
CERTIFICATE OF CORRECTION

PATENT NO. : 4,153,671
DATED : May 8, 1979
INVENTOR(S) : PORTER CLEMENTS, MICHAEL R. BASILA, JAMES J. BARRY

It is certified that error appears in the above-identified patent and that said Letters Patent are hereby corrected as shown below:

Column 1, line 20, "in" should read --is--.

Column 3, line 1, "GHVS" should read --GHSV--.

Signed and Sealed this

Twenty-fourth Day of July 1979

[SEAL]

Attest:

LUTRELLE F. PARKER
Attesting Officer   Acting Commissioner of Patents and Trademarks